United States Patent
Suzuki et al.

(10) Patent No.: US 10,208,834 B2
(45) Date of Patent: Feb. 19, 2019

(54) INJECTION MOLDED SHAFT

(71) Applicant: Enplas Corporation, Saitama (JP)

(72) Inventors: Yasuhiro Suzuki, Saitama (JP); Shinichiro Okamoto, Saitama (JP)

(73) Assignee: ENPLAS CORPORATION, Saitama (JP)

( * ) Notice: Subject to any disclaimer, the term of this patent is extended or adjusted under 35 U.S.C. 154(b) by 124 days.

(21) Appl. No.: 15/110,571

(22) PCT Filed: Jan. 5, 2015

(86) PCT No.: PCT/JP2015/050006
§ 371 (c)(1),
(2) Date: Jul. 8, 2016

(87) PCT Pub. No.: WO2015/105062
PCT Pub. Date: Jul. 16, 2015

(65) Prior Publication Data
US 2016/0327122 A1 Nov. 10, 2016

(30) Foreign Application Priority Data

Jan. 9, 2014 (JP) ................................ 2014-002217
Nov. 6, 2014 (JP) ................................ 2014-225941

(51) Int. Cl.
*F16C 1/02* (2006.01)
*F16H 1/20* (2006.01)
(Continued)

(52) U.S. Cl.
CPC ............... *F16H 1/203* (2013.01); *F16C 1/02* (2013.01); *F16C 3/02* (2013.01); *F16D 3/725* (2013.01);
(Continued)

(58) Field of Classification Search
CPC .... F16C 1/02; F16C 3/02; F16C 3/026; F16H 1/203; F16H 1/16; F16D 3/725; F16D 3/72; B29C 45/40
(Continued)

(56) References Cited

U.S. PATENT DOCUMENTS 2,009,496 A * 7/1935 Johnson ................. B23D 79/00
267/181 X
3,610,056 A * 10/1971 Bartholomew ........... F16C 1/06
464/52
(Continued)

FOREIGN PATENT DOCUMENTS

JP 11-512974 11/1999
JP 2003-33947 2/2003
(Continued)

OTHER PUBLICATIONS

International Search Report dated Mar. 10, 2015 in International (PCT) Application No. PCT/JP2015/050006.

*Primary Examiner* — Greg Binda
(74) *Attorney, Agent, or Firm* — Wenderoth, Lind & Ponack, L.L.P.

(57) ABSTRACT

In a shaft body, a first end in an axial direction of a core part having a crisscross cross section orthogonal to the axial direction is connected to a helical gear via a first connecting part, and the second end in the axial direction of the core part is connected to a worm via a second connecting part. A plurality of first framework parts are formed at regular intervals along a direction of a shaft core in the core part between the first connecting part and the second connecting part. A second framework part extends across the first connecting part, the first framework part, and the core part like a diagonal brace. A third framework part extends across a pair of the first framework parts adjacent to each other and the core part like a diagonal brace. A fourth framework part extends across the second connecting part, the first framework part, and the core part like a diagonal brace.

11 Claims, 10 Drawing Sheets

(RECTANGULAR COORDINATE SYSTEM)

(51) Int. Cl.
  *F16D 3/72*   (2006.01)
  *F16H 1/16*   (2006.01)
  *F16C 3/02*   (2006.01)
  *B29C 45/40*  (2006.01)

(52) U.S. Cl.
  CPC ............... *F16H 1/16* (2013.01); *B29C 45/40* (2013.01); *F16C 3/026* (2013.01); *F16D 3/72* (2013.01)

(58) Field of Classification Search
  USPC .............................. 464/52, 78, 181; 267/181
  See application file for complete search history.

(56) References Cited

U.S. PATENT DOCUMENTS

| 3,737,154 A | * | 6/1973 | Johnson | ................. F16F 1/403 267/181 X |
| 4,774,903 A | * | 10/1988 | Goold | .................... B63B 21/50 |
| 5,855,053 A | | 1/1999 | Arena | |
| 2014/0059832 A1 | | 3/2014 | Tokioka | |

FOREIGN PATENT DOCUMENTS

| JP | 2005-147303 | 6/2005 |
| WO | 2012/128213 | 9/2012 |

\* cited by examiner (RECTANGULAR
COORDINATE SYSTEM)

INJECTION MOLDED SHAFT

TECHNICAL FIELD

The present invention relates to an injection molded shaft formed into a desired shape by injection molding, and that can absorb rotation energy by undergoing twisting deformation.

BACKGROUND OF THE INVENTION

Many shafts used as power transmission components for automobiles or the like are made of metal and are created by a cutting operation, so the product cost is high and the weight is heavy.

Figure 10:
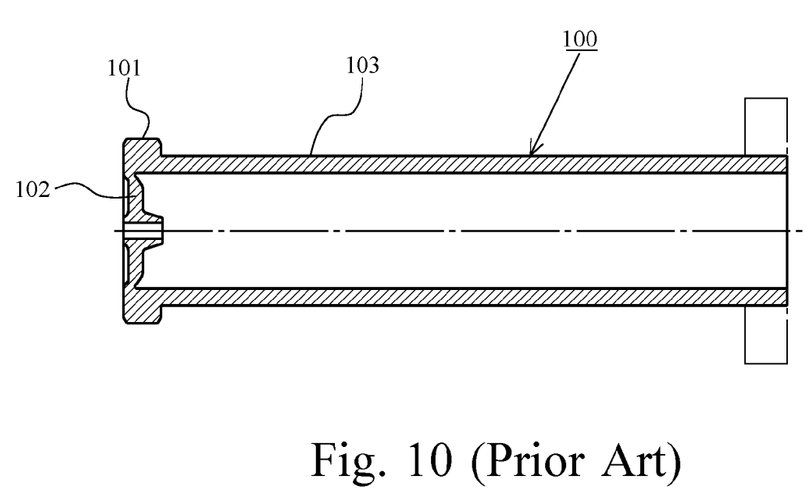
FIG. 10 is a vertical cross sectional view illustrating a conventional injection molded shaft.

An injection molded shaft 100 made of synthetic resin in FIG. 10 was proposed to solve such problems. In the injection molded shaft 100 illustrated in FIG. 10, a gear 101 and an inward flange 102 are formed integrally with one end of a cylindrical shaft body 103 and a rotary torque is transferred to another rotary component (not illustrated) via the gear 101 (see JP-A-2003-33947).

However, since the twisting stiffness of the cylindrical shaft body 103 is large in the injection molded shaft 100 illustrated in FIG. 10, even when a rotary torque is applied impulsively, the shaft body 103 cannot undergo sufficient twisting deformation and the shock caused by sudden changes in torque could not be absorbed by twisting deformation of the shaft body 103. Therefore, in the injection molded shaft 100 illustrated in FIG. 10, rotation transmission components such as the gear 101 receive a shock caused by sudden changes in torque, possibly breaking rotation transmission components such as the gear 101.

Therefore, the invention provides an injection molded shaft that can absorb a shock caused by sudden changes in torque by undergoing twisting deformation of a shaft body when sudden changes in torque are applied.

SUMMARY OF THE INVENTION

Figure 9:
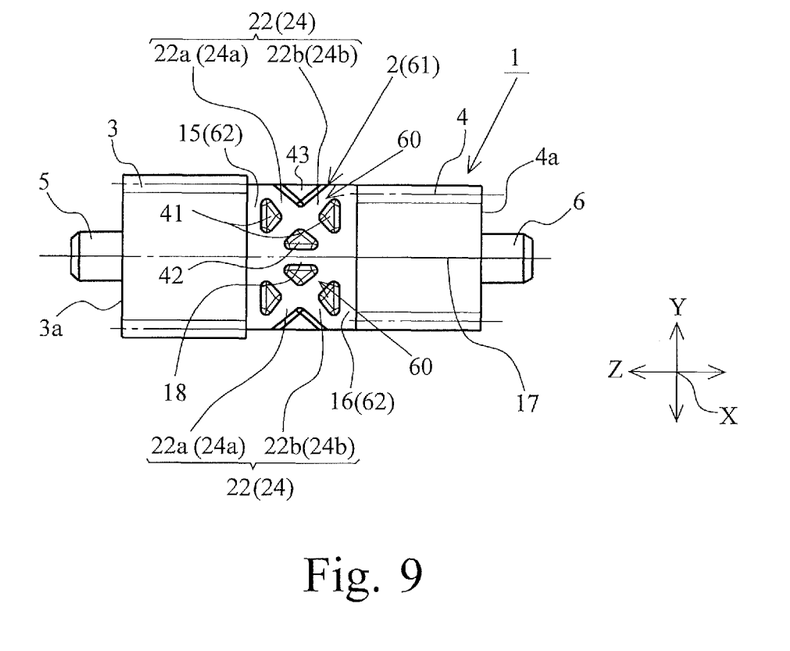
FIG. 9 is a diagram illustrating an injection molded shaft according to a fifth modification of the first embodiment of the invention and the diagram corresponds to FIG. 2A.

As illustrated in FIG. 9, the invention relates to an injection molded shaft 1 including a first torque applied part 3 formed at one end in an axial direction, a second torque applied part 4 formed at another end in the axial direction, and a shaft body 2 connecting the first torque applied part 3 to the second torque applied part 4 along a direction of a shaft core (longitudinal center axis) 17. In the invention, the shaft body 2 includes a first connecting part 15 formed integrally with the first torque applied part 3, a second connecting part 16 formed integrally with the second torque applied part 4, a core part 18 extending from the first connecting part 15 to the second connecting part 16 along the shaft core (longitudinal center axis) 17, the core part 18 having a crisscross cross section orthogonal to the axial direction, and a diagonal-brace-shaped framework part 60 disposed in a portion partitioned by the first connecting part 15, the second connecting part 16, and the core part 18, the diagonal-brace-shaped framework part 60 extending across the first connecting part 15, the second connecting part 16, and the core part 18 like a diagonal brace.

In addition, as illustrated in FIGS. 1 to 9, the invention relates to an injection molded shaft 1 including a first torque applied part 3 formed at one end in an axial direction, a second torque applied part 4 formed at another end in the axial direction, and a shaft body 2 connecting the first torque applied part 3 to the second torque applied part 4 along a direction of a shaft core (i.e., longitudinal center axis) 17. In the invention, the shaft body 2 includes at least one framework unit 61. In addition, the framework unit 61 includes a core part 18 extending along the shaft core (longitudinal center axis) 17, and the core part 18 having a crisscross cross section orthogonal to the axial direction. A pair of discoid framework parts 62 and 62 are disposed at one end and another end along the shaft core (center axis) 17 of the core part 18 so as to face each other, the pair of discoid framework parts 62 and 62 having discoid cross sections orthogonal to the axial direction, and a diagonal-brace-shaped framework part 60 disposed in a portion partitioned by the pair of discoid framework parts 62 and 62 and the core part 18. The diagonal-brace-shaped framework part 60 extending across the pair of discoid framework parts 62 and 62 and the core part 18 like a diagonal brace.

In addition, as illustrated in FIGS. 1 to 8, the invention relates to an injection molded shaft 1 including a first torque applied part 3 formed at one end in an axial direction, a second torque applied part 4 formed at another end in the axial direction, and a shaft body 2 connecting the first torque applied part 3 to the second torque applied part 4 along a direction of a shaft core. In the invention, the shaft body 2 includes

- a first connecting part 15 formed integrally with the first torque applied part 3,
- a second connecting part 16 formed integrally with the second torque applied part 4,
- a core part 18 extending from the first connecting part 15 to the second connecting part 16 along the shaft core (center axis) 17, the core part 18 having a crisscross cross section orthogonal to the axial direction,
- a plurality of first framework parts 21 formed at regular intervals along the direction of the shaft core (center axis) 17 in the core part 18 between the first connecting part 15 and the second connecting part 16, each of the first framework parts 21 having a discoid cross section orthogonal to the axial direction,
- a second framework part 22 disposed in a portion partitioned by the first connecting part 15, the first framework part 21 adjacent to the first connecting part 15, and the core part 18, the second framework part 22 extending across the first connecting part 15, the first framework part 21, and the core part 18 like a diagonal brace,
- a third framework part 23 disposed in a portion partitioned by a pair of the first framework parts 21 and 21 adjacent to each other and the core part 18, the third framework part 23 extending across the pair of first framework parts 21 and 21 adjacent to each other and the core part 18 like a diagonal brace, and
- a fourth framework part 24 disposed in a portion partitioned by the second connecting part 16, the first framework part 21 adjacent to the second connecting part 16, and the core part 18, the fourth framework part 24 extending across the second connecting part 16, the first framework part 21, and the core part 18 like a diagonal brace.

Advantageous Effects of Invention

Even when sudden changes in torque are applied, the injection molded shaft according to the invention can absorb the energy caused by sudden changes in torque by undergoing twisting deformation of the shaft body and reduce the shock caused by sudden changes in torque using the shaft body.

DETAILED DESCRIPTION OF THE INVENTION

Embodiments of the invention will be described in detail below with reference to the drawings.

First Embodiment

Figure 1:
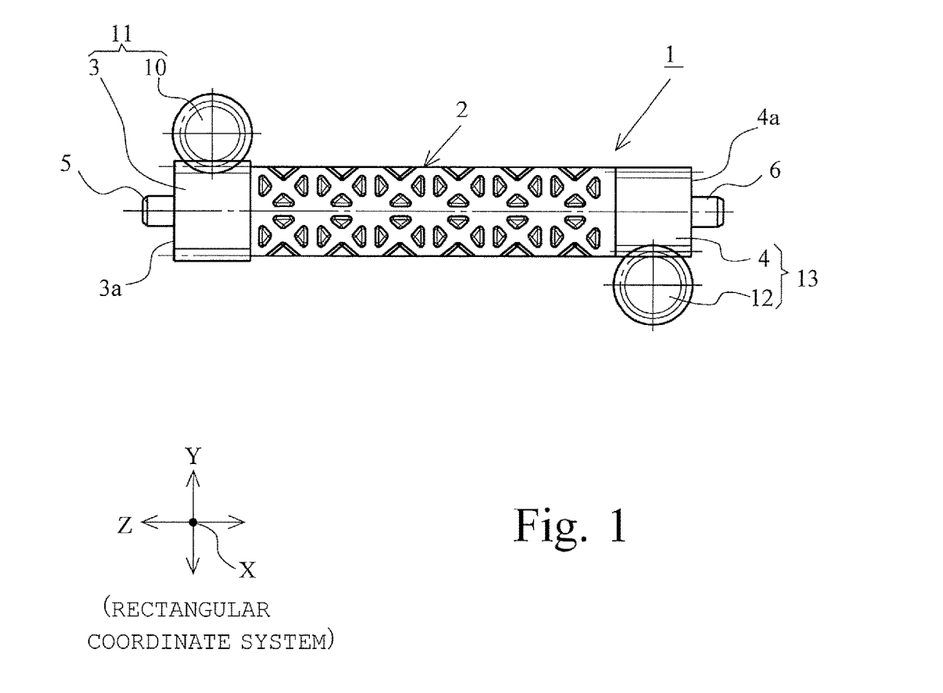
FIG. 1 is a diagram illustrating the use state of an injection molded shaft according to a first embodiment of the invention.
Figure 2A:
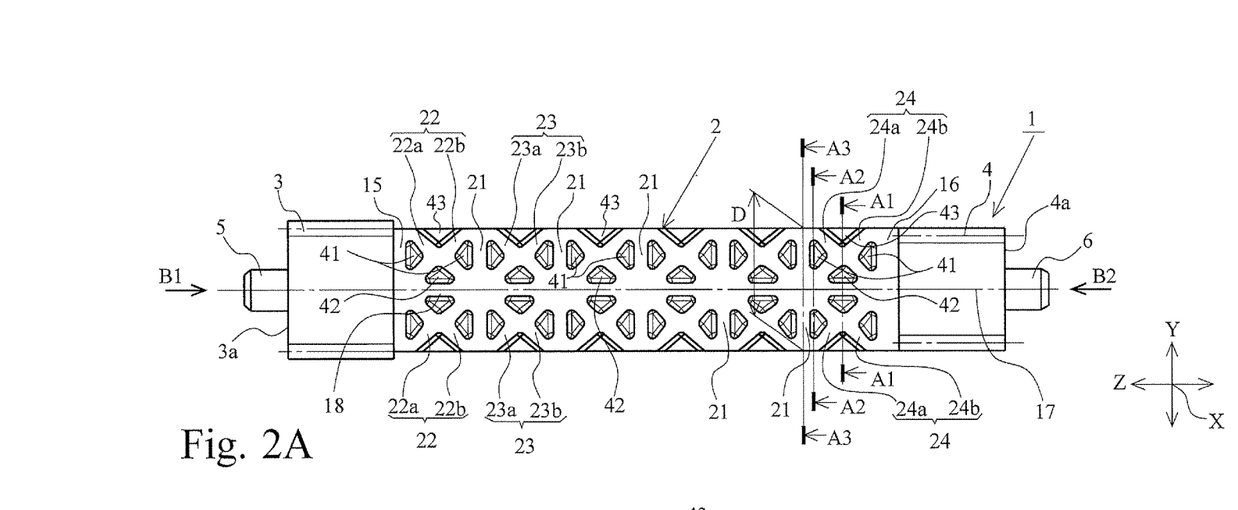
FIG. 2A is a front view (seen from an X-axis direction) illustrating the injection molded shaft according to the first embodiment of the invention.
Figure 2B:
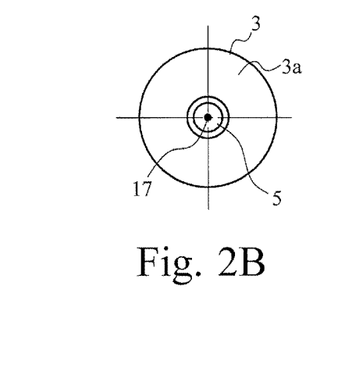
FIG. 2B is a left side view illustrating the injection molded shaft seen from the direction of an arrow B1 in FIG. 2A.
Figure 2C:
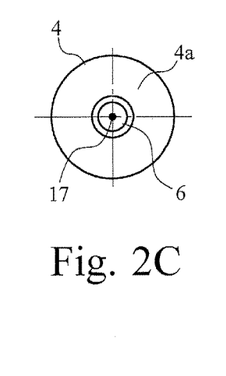
FIG. 2C is a right side view illustrating the injection molded shaft seen from the direction of an arrow B2 in FIG. 2A.
Figure 2D:
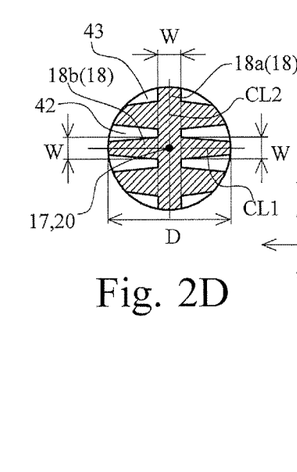
FIG. 2D is a cross sectional view illustrating the injection molded shaft taken along a line A1-A1 in FIG. 2A.
Figure 2E:
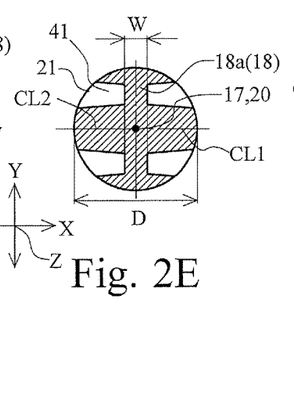
FIG. 2E is a cross sectional view illustrating the injection molded shaft taken along a line A2-A2 in FIG. 2A.
Figure 2F:
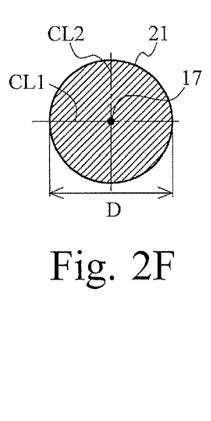
FIG. 2F is a cross sectional view illustrating the injection molded shaft taken along a line A3-A3 in FIG. 2A.
Figure 3A:
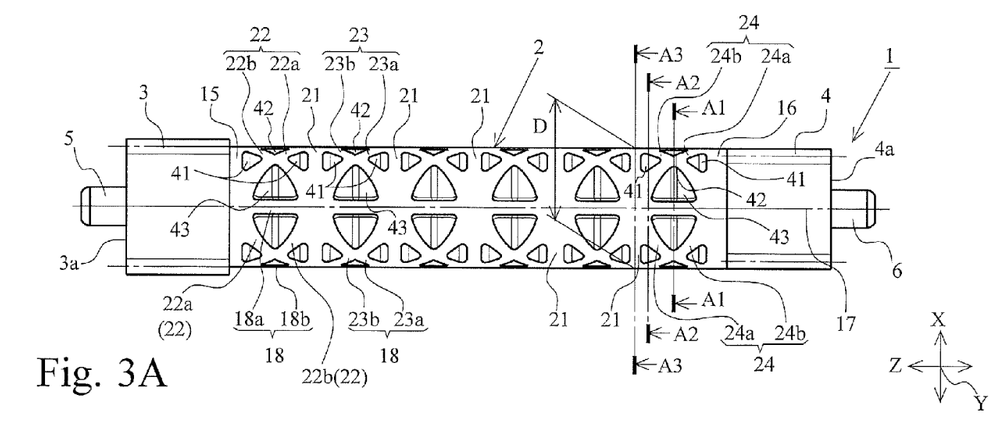
FIG. 3A is a plan view (seen from a Y-axis direction) illustrating the injection molded shaft according to the first embodiment of the invention.
Figure 3B:
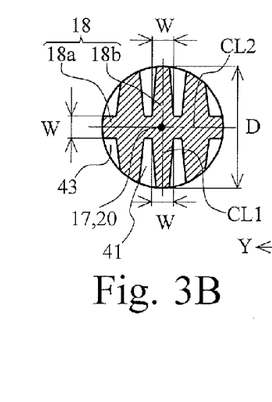
FIG. 3B is a cross sectional view illustrating the injection molded shaft taken along the line A1-A1 in FIG. 3A.
Figure 3C:
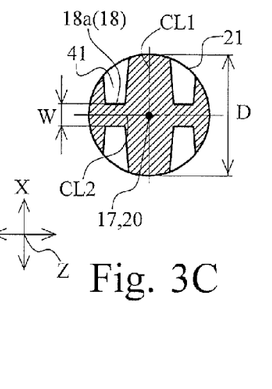
FIG. 3C is a cross sectional view illustrating the injection molded shaft taken along the line A2-A2 in FIG. 3A.
Figure 3D:
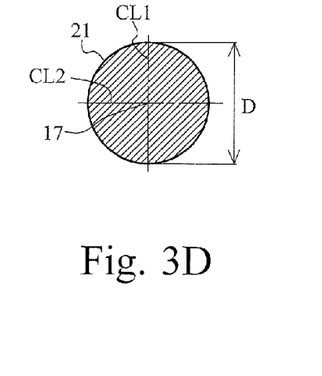
FIG. 3D is a cross sectional view illustrating the injection molded shaft taken along the line A3-A3 in FIG. 3A.
Figure 4:
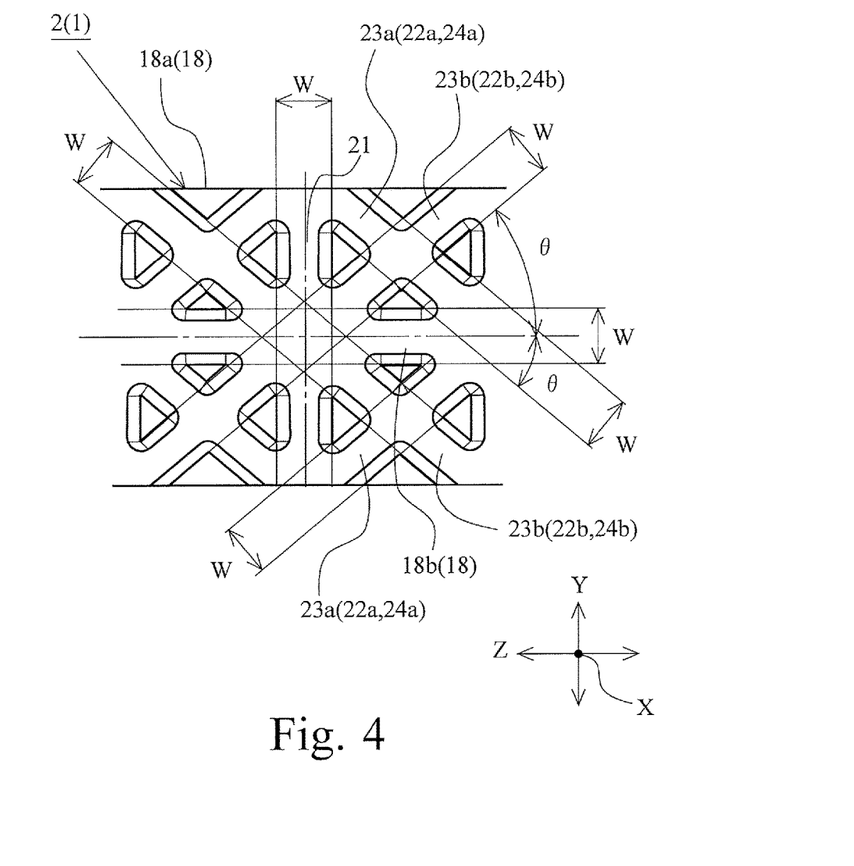
FIG. 4 is an enlarged view illustrating a part of the injection molded shaft in FIG. 2A.

FIGS. 1 to 4 illustrate the injection molded shaft 1 according to the first embodiment of the invention. FIG. 1 is a diagram illustrating the use state of the injection molded shaft 1. In addition, FIG. 2A is a front view (seen from the X-axis direction) illustrating the injection molded shaft 1, FIG. 2B is a left side view illustrating the injection molded shaft 1 seen from the direction of the arrow B1 in FIG. 2A, FIG. 2C is a right side view illustrating the injection molded shaft 1 seen from the direction of the arrow B2 in FIG. 2A, FIG. 2D is a cross sectional view illustrating the injection molded shaft 1 taken along the line A1-A1 in FIG. 2A, FIG. 2E is a cross sectional view illustrating the injection molded shaft 1 taken along the line A2-A2 in FIG. 2A, and FIG. 2F is a cross sectional view illustrating the injection molded shaft 1 taken along the line A3-A3 in FIG. 2A. In addition, FIG. 3A is a plan view (seen from the Y-axis direction) illustrating the injection molded shaft 1, FIG. 3B is a cross sectional view illustrating the injection molded shaft 1 taken along the line A1-A1 in FIG. 3A, FIG. 3C is a cross sectional view illustrating the injection molded shaft 1 taken along the line A2-A2 in FIG. 3A, and FIG. 3D is a cross sectional view illustrating the injection molded shaft 1 taken along the line A3-A3 in FIG. 3A. In addition, FIG. 4 is an enlarged view illustrating a part of the injection molded shaft 1 (particularly the shaft body 2) in FIG. 2A.

(Structure of Injection Molded Shaft)

As illustrated in FIGS. 1 to 3, the injection molded shaft 1 includes a helical gear 3 as the first torque applied part formed at a first end in the axial direction, a worm 4 as the second torque applied part formed at a second end in the axial direction, and the shaft body 2 connecting the helical gear 3 to the worm 4 integrally along the shaft core direction. In addition, the injection molded shaft 1 has a rod-shaped first boss 5 formed integrally at the rotation center of a side 3a of the helical gear 3 and a rod-shaped second boss 6 formed integrally at the rotation center of a side 4a of the worm 4 (see FIGS. 2A to 2C). The injection molded shaft 1 in such a structure is integrally formed by injecting molten resin such as POM (polyacetal) or PA (polyamide) into a cavity 8 of a die 7 as described in detail later.

As illustrated in FIG. 1, in the injection molded shaft 1, the helical gear 3 at the first end in the axial direction is engaged with another first helical gear 10 to form a screw gear 11, and the worm 4 at the second end in the axial direction is engaged with another second helical gear 12 to form a worm gear 13. In the injection molded shaft 1 as described above, when, for example, the rotation of a motor (not illustrated) or the like is transferred via the screw gear 11, the rotation is transferred to the second helical gear 12 via the worm 4 formed integrally with the shaft body 2. At this time, the shaft body 2 of the injection molded shaft 1 undergoes twisting deformation by the rotation torque applied via the helical gear 3 at the one end in the axial direction and the rotation torque applied via the worm 4 at the other end in the axial direction.

As illustrated in FIGS. 2 to 4, in the shaft body 2 of the injection molded shaft 1, the discoid first connecting part 15 positioned at the first end in the axial direction is formed integrally with the helical gear 3 and the discoid second connecting part 16 positioned at the other end in the axial direction is formed integrally with the worm 4. In the shaft body 2, the first connecting part 15 is connected to the second connecting part 16 by the core part 18 extending along the shaft core (center axis) 17. The core part 18 has a crisscross cross section orthogonal to the axial direction and is positioned so that the center of the intersecting portion of the cross is aligned with the shaft core (center axis) 17. In the core part 18 between the first connecting part 15 and the second connecting part 16, the plurality of first framework parts 21 are formed at regular intervals along the direction in which the shaft core (center axis) 17 extends. The first framework parts 21 are formed into the core part 18 so as to have discoid cross sections orthogonal to the axial direction. In the shaft body 2, in the portion partitioned by the first connecting part 15, the first framework part 21 adjacent to the first connecting part 15, and the core part 18, the second framework part 22 is disposed. The second framework part 22 extends across the first connecting part 15, the first framework part 21, and the core part 18 like a diagonal brace and includes a pair of diagonal brace members 22a and 22b intersecting with each other like an X shape. In the shaft body 2, the third framework part 23 is disposed in the portion partitioned by the pair of first framework parts 21 and 21 adjacent to each other and the core part 18. The third framework part 23 extends across the pair of first framework parts 21 and 21 and the core part 18 like a diagonal brace and includes the pair of diagonal brace members 23a and 23b intersecting with each other like an X shape as in the second framework part 22. In the shaft body 2, the fourth framework part 24 is disposed in the portion partitioned by the second connecting part 16, the first framework part 21 adjacent to the second connecting part 16, and the core part 18. The fourth framework part 24 extends across the second connecting part 16, the first framework part 21, and the core part 18 like a diagonal brace and includes a pair of diagonal brace members 24a and 24b intersecting with each other like an X shape as in the second and third framework parts 22 and 23.

As illustrated in FIGS. 2D and 2E, FIGS. 3B and 3C, and FIG. 4, in the shaft body 2 of the injection molded shaft 1, a first core portion 18a of the core part 18 extending along the Y-axis has a wall thickness of W and a second core portion 18b of the core part 18 extending along the X-axis has a wall thickness of W, which is the same as the wall thickness W of the first core portion 18a. The wall thickness of the second core portion 18b is measured at the connection portion with the first core portion 18a. In FIGS. 2 to 4, the X-axis matches the direction in which a first movable mold 33 for molding the shaft body 2 is separated (see FIG. 5B) and the second core portion 18b has a disconnection gradient for facilitating separation from the first movable mold 33. As a result, the wall thickness of the second core portion 18b becomes small with distance from the first core portion 18a along the X-axis direction. In addition, in the first to fourth framework parts 21 to 24, a wall thickness of a connection portion with the first core portion 18a is W, which is the same as the wall thickness W of the first core portion 18a. The first to fourth framework parts 21 to 24 have a disconnection gradient as in the second core portion 18b and the wall thickness becomes small with distance from the first core portion 18a along the X-axis direction. In addition, the shaft body 2 of the injection molded shaft 1 is formed so as to have the same outer dimension (D) from the one end in the axial direction to the other end in the axial direction. In the shaft body 2 of the injection molded shaft 1 described above, the wall thicknesses W of the core part 18 and the first to fourth framework parts 21 to 24 are determined so as to enable flexible twisting deformation as compared with a conventional cylindrical shaft (see FIG. 9).

As illustrated in FIGS. 2A and 3A, the shaft body 2 of the injection molded shaft 1 is line-symmetric with respect to the shaft core 17 along the Z-axis direction and a plurality of constant shapes formed by the first to fourth framework parts 21 to 24 and the like are formed at regular intervals along the shaft core (center axis) 17. In addition, as illustrated in FIGS. 2D to 2F and 3B to 3D, the cross section orthogonal to the axial direction of the shaft body 2 of the injection molded shaft 1 is line-symmetric with respect to a center line CL1 along the X-axis and a center line CL2 along the Y-axis. Accordingly, the injection molded shaft 1 according to the embodiment is accurately injection-molded since the core part 18 and the first to fourth framework parts 21 to 24 of the shaft body 2 are formed to have the same wall thickness W in addition to the above reason.

As illustrated in FIG. 4, in the shaft body 2 of the injection molded shaft 1, the pairs of diagonal brace members 22a to 24a and 22b to 24b constituting the second to fourth framework parts 22 to 24 intersect with the shaft core (center axis) 17 of the injection molded shaft 1 at an angle θ. The angle θ is appropriately set depending on the spacing between the first connecting part 15 and the first framework part 21 adjacent to the first connecting part 15, the spacing between the pair of first framework parts 21 and 21 adjacent to each other, the spacing between the second connecting part 16 and the first framework part 21 adjacent to the second connecting part 16, the outer dimension D of the shaft body 2, and the like.

(Injection Molding Die)

Figure 5A:
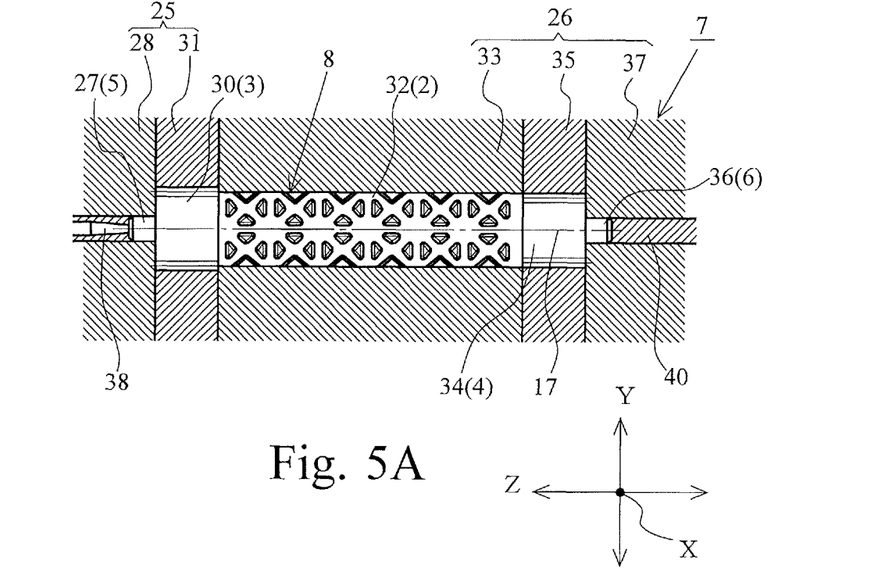
FIG. 5A is a diagram illustrating an injection molded shaft die taken along a Y-Z coordinate plane and FIG. 5B is a diagram illustrating the injection molded shaft die taken along an X-Z coordinate plane.
Figure 5B:
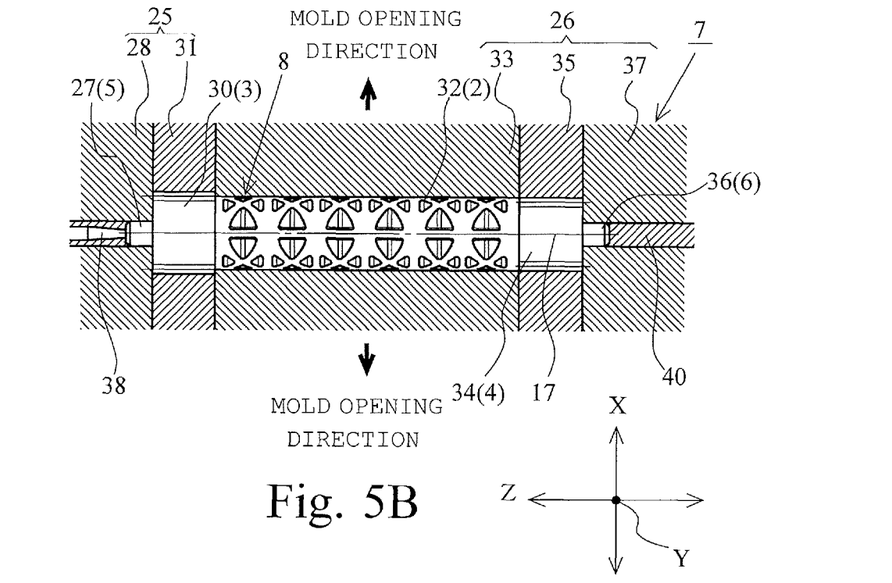

FIG. 5 is a diagram schematically illustrating the injection molding die 7 for the injection molded shaft 1 according to the embodiment. FIG. 5A is a cross sectional view illustrating the injection molding die 7 taken along a Y-Z coordinate plane of the rectangular coordinate system and FIG. 5B is a cross sectional view illustrating the injection molding die 7 taken along an X-Z coordinate plane of the rectangular coordinate system.

As illustrated in FIG. 5, the injection molding die 7 includes a fixed mold 25 and a movable mold 26. The fixed mold 25 includes a first fixed mold 28 having a first cavity 27 for shaping the first boss 5 at the first end in the axial direction of the injection molded shaft 1 and a second fixed mold 31 having a second cavity 30 for shaping the helical gear 3 of the injection molded shaft 1. The movable mold 26 includes the first movable mold (shaft body formation portion of the injection molding die 7) 33 in which a third cavity 32 for shaping the shaft body 2 of the injection molded shaft 1 is formed, a second movable mold 35 in which a fourth cavity 34 for shaping the worm 4 of the injection molded shaft 1 is formed, and a third movable mold 37 in which a fifth cavity 36 for shaping the second boss 6 at the other end in the axial direction of the injection molded shaft 1 is formed. The first movable mold 33 is split into two so as to be opened along the X-axis direction from the position of the shaft core (center axis) 17 of the third cavity 32 (see FIG. 5B). In addition, a gate 38 is provided in the first fixed mold 28 of the injection molding die 7 so as to be opened toward the inside of the first cavity 27. In addition, the first to fifth cavities 27, 30, 32, 34, and 36 constitute the cavity 8 for shaping the injection molded shaft 1.

As illustrated in FIG. 5, in the state in which the fixed mold 25 and the movable mold 26 are closed, molten synthetic resin is injected into the first cavity 27 from the gate 28 and the molten synthetic resin injected into the first cavity 27 is supplied to the second to fifth cavities 30, 32, 34, and 36. As a result, the entire injection molded shaft integrally formed therein and described above has a unitary, one-piece construction formed of the injected resin material. When the injection molding die 7 is configured by changing the fixed mold 25 in FIG. 5 to a movable mold and the movable mold 26 in FIG. 5 to a fixed mold, the gate 28 is provided so as to be opened toward the fifth cavity 36 to be positioned on the fixed mold side.

In the state illustrated in FIG. 5, after the synthetic resin injected into the cavity 8 of the injection molding die 7 is cooled and solidified (after the injection molded shaft 1 is formed), the movable mold 26 is separated from the fixed mold 25 while being rotated (moved in the Z-axis direction). This causes the injection molded shaft 1 to be separated from the fixed mold 25 while being held by the movable mold 26. Next, the first movable mold 33 is opened (split into two) along the X-axis direction, the first boss 5, the helical gear 3, and the shaft body 2 are exposed from the second movable mold 35, the worm 4 is housed in the second movable mold 35, and the second boss 6 is housed in the third movable mold 37. Next, an eject pin 40 housed in the third movable mold 37 in a slidable state continuously presses the second boss 6 of the injection molded shaft 1, the worm 4 moves in the second movable mold 35 while being rotated, the worm 4 is pushed out of the second movable mold 35, and the injection molded shaft 1 is removed from the injection molding die 7. Note that the first movable mold 33 of the injection molding die 7 is opened (split into two) along the Y-axis direction in the coordinate axes (the up-down direction in FIG. 2D is the X-axis direction and the left-right direction in FIG. 3B is the X-axis direction) obtained by rotating the cross sections orthogonal to the axial direction illustrated in FIGS. 2D and 3B counterclockwise (left rotation direction) by 90 degrees.

Effect of Present Embodiment

The injection molded shaft 1 according to the embodiment as described above can absorb the energy caused by sudden changes in torque by undergoing the flexible twisting deformation of the shaft body 2 even when sudden changes in torque are applied, and can reduce the shock caused by sudden changes in torque by undergoing the twisting deformation of the shaft body 2. As a result, the injection molded shaft 1 according to the embodiment can prevent the helical gear 3 formed at the one end in the axial direction and the worm 4 formed at the other end in the axial direction from receiving an excess load, prevent the teeth of the helical gear 3 at the one end in the axial direction and the teeth of another first helical gear 10 engaged with the helical gear 3 from being broken, and prevent the teeth of the worm 4 formed at the other end in the axial direction and the teeth of another second helical gear 12 engaged with the worm 4 from being broken.

In addition, since the core part 18 and the first to fourth framework parts 21 to 24 of the shaft body 2 in the injection molded shaft 1 according to the embodiment have the same wall thickness (W), the shaft body 2 can be injection-molded accurately without occurrence of a molding failure due to variations in the shrinkage ratio.

In addition, in the injection molded shaft 1 according to the embodiment, many hollowed concave parts 41 to 43 are formed between the first connecting part 15, the second framework part 22, the first framework part 21, and the core part 18. In addition, in the injection molded shaft 1, many hollowed concave parts 41 to 43 are formed between the first framework parts 21 and 21 adjacent to each other, the third framework part 23, and the core part 18. In addition, in the injection molded shaft 1, many hollowed concave parts 41 to 43 are formed between the second connecting part 16, the fourth framework part 24, and the core part 18. Accordingly, in the injection molded shaft 1 according to the embodiment, as compared with the case in which the injection molded shaft 1 is shaped in a rod, since the amount of synthetic resin material can be reduced and the cooling time after injection into the cavity 8 of the injection molding die 7 can be shortened, the injection molding cycle can be shortened, the production efficiency can be improved, and the total weight can be reduced.

In addition, since the injection molded shaft 1 according to the embodiment can reduce a shock caused by sudden changes in torque by undergoing the twisting deformation of the shaft body 2, vibrations caused by sudden changes in torque can be reduced and the generation of noise caused by sudden changes in torque can be suppressed. Accordingly, the injection molded shaft 1 according to the embodiment reduces operation noise during power transmission.

In addition, in the injection molded shaft 1 according to the embodiment, since the plurality of hollowed concave parts 43 are formed at regular intervals along the axial direction at the end of the core part 18 (the first core portion 18a and the second core portion 18b) of the shaft body 2, voids (air bubbles) are not easily generated, thereby efficiently preventing occurrence of a molding failure caused by voids.

First Modification and Second Modification of First Embodiment

Figure 6A:
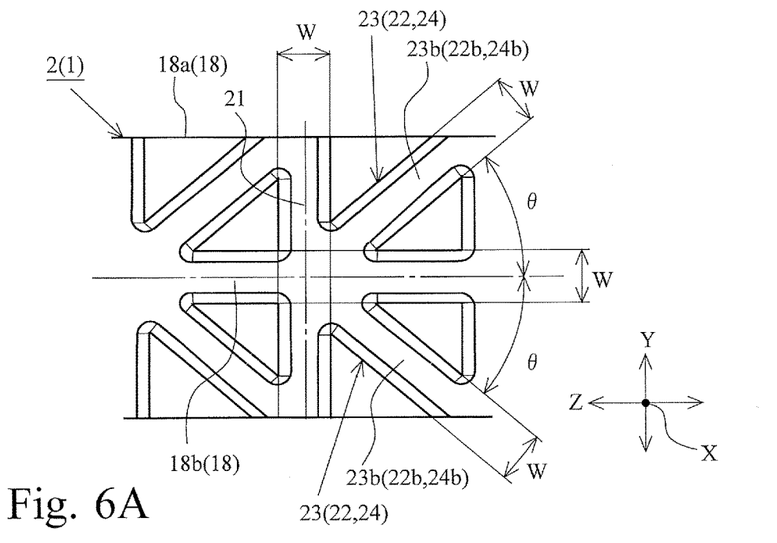
FIG. 6A is a diagram illustrating an injection molded shaft according to a first modification of the first embodiment of the invention and an enlarged view (corresponding to FIG. 4) illustrating a part of a shaft body. In addition.
Figure 6B:
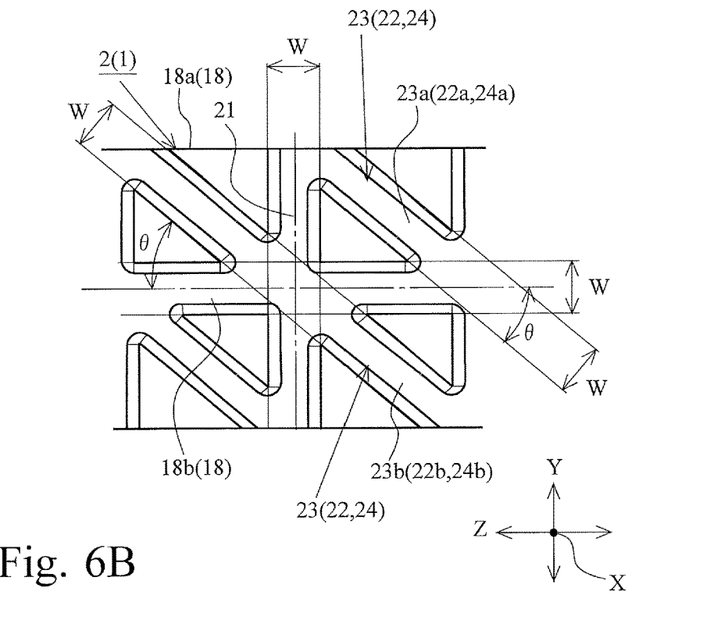
FIG. 6B is a diagram illustrating an injection molded shaft according to a second modification of the first embodiment of the invention and an enlarged view (corresponding to FIG. 4) illustrating a part of a shaft body.

FIG. 6A is a diagram illustrating an injection molded shaft 1 according to a first modification of the first embodiment of the invention and an enlarged view (corresponding to FIG. 4) illustrating a part of the shaft body 2. In addition, FIG. 6B is a diagram illustrating an injection molded shaft 1 according to a second modification of the first embodiment of the invention and an enlarged view (corresponding to FIG. 4) illustrating a part of the shaft body 2.

In the injection molded shaft 1 according to the first embodiment of the invention, the second to fourth framework parts 22 to 24 include the pairs of diagonal brace members 22a to 24a and 22b to 24b intersecting with each other like an X shape. However, the invention is not limited to the injection molded shaft 1 according to the first embodiment and each of the second to fourth framework parts 22 to 24 may be configured by one diagonal brace member, which is one of 22a to 24a (or 22b to 24b), and the twisting stiffness of the injection molded shaft 1 may be reduced according to the use condition and the like. In the injection molded shaft 1 illustrated in FIGS. 6A and 6B, the same structural portions as in the injection molded shaft 1 illustrated in FIG. 4 are given the same reference numerals and duplicate descriptions as in the injection molded shaft 1 according to the first embodiment are omitted.

Third Modification of First Embodiment

Figure 7:
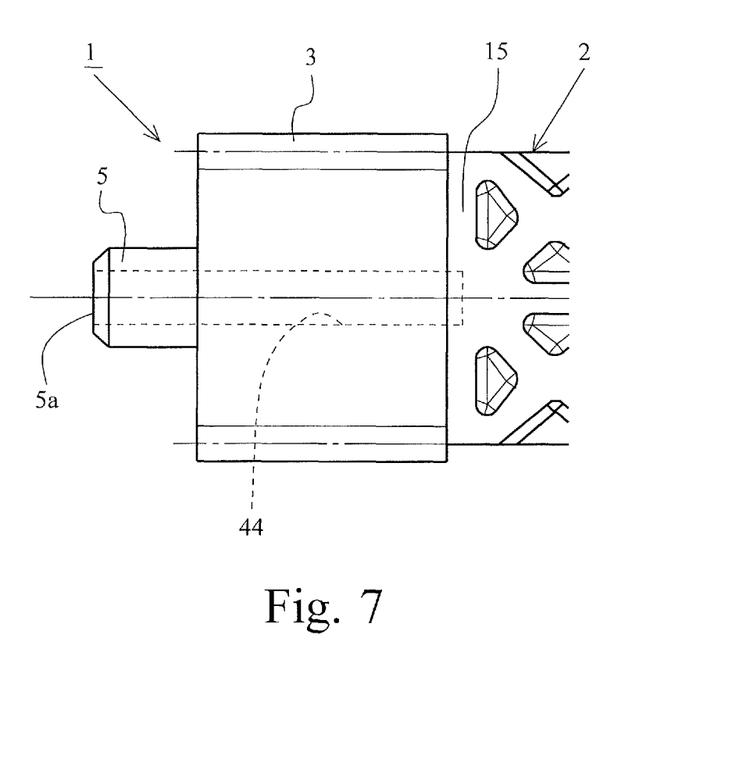
FIG. 7 is a diagram illustrating an injection molded shaft according to a third modification of the first embodiment of the invention and the diagram illustrates one end in an axial direction of the injection molded shaft.

FIG. 7 is a diagram illustrating an injection molded shaft 1 according to a third modification of the first embodiment of the invention and a diagram illustrating one end in the axial direction of the injection molded shaft 1.

As illustrated in FIG. 7, in the injection molded shaft 1 according to the first embodiment of the invention, when the outer dimension of the first boss 5 close to the helical gear 3 is large, a hollowed hole 44 is desirably formed along the center axis 17 from an end face 5a of the first boss 5 to the first connecting part 15 of the shaft body 2. In the injection molded shaft 1 in which this hollowed hole 44 is formed, occurrence of a molding failure due to shrinkage or voids can be prevented and the cooling time and the injection molding cycle can be shortened. Although not illustrated in the drawing, in the injection molded shaft 1 according to the first embodiment, when the outer dimension of the first boss 6 close to the worm 4 is large, to obtain the same effect of the hollowed hole 44 in the first boss 5, a hollowed hole is desirably formed along the center axis 17 from the end face of the second boss to the second connecting part 16 of the shaft body 2 (see FIG. 2).

Fourth Modification of First Embodiment

FIG. 8 is a diagram illustrating an injection molded shaft 1 according to a fourth modification of the first embodiment of the invention and the diagram corresponds to FIG. 2. In the injection molded shaft 1 illustrated in FIG. 8, the same structural portions as in the injection molded shaft 1 illustrated in FIG. 2 are given the same reference numerals and duplicate descriptions as in the injection molded shaft 1 according to the first embodiment are omitted.

As illustrate in FIG. 8, the injection molded shaft 1 according to the modification has a semicylindrical hollowed concave part 46 at an intersecting portion (first intersecting portion) 45 at which the second framework part 22 (diagonal brace members 22b) positioned at the one end in the axial direction of the shaft body 2 intersects with the core part 18. When seen from the direction along the X-axis, the chord of this semicylindrical hollowed concave part 46 is positioned along the outer periphery of the border between the first connecting part 15 and the intersecting portion 45. In addition, the injection molded shaft 1 has a cylindrical hollowed concave part 48 at an intersecting portion (second intersecting portion) 47 between the first framework part 21, the second framework part 22 (diagonal brace members 22a), the third framework part 23 (diagonal brace members 23b), and the core part 18. In addition, the injection molded shaft 1 has a cylindrical hollowed concave part 51 at an intersecting portion (third intersecting portion) 50 between the first framework part 21, the third framework part 23 (diagonal brace members 23a and 23b), and the core part 18. In addition, the injection molded shaft 1 has a cylindrical hollowed concave part 53 at an intersecting portion (fourth intersecting portion) 52 between the first framework part 21, the third framework part 23 (diagonal brace members 23a), the fourth framework part 24 (diagonal brace members 24b), and the core part 18. In addition, the injection molded shaft 1 has a semicylindrical hollowed concave part 55 at an intersecting portion (fifth intersecting portion) 54 between the fourth framework part 24 (diagonal brace members 24a) and the core part 18. When seen from the direction along the X-axis, the chord of the semicylindrical hollowed concave part 55 is positioned along the outer periphery of the border between the second connecting part 16 and the intersecting portion 54.

Figure 8A:
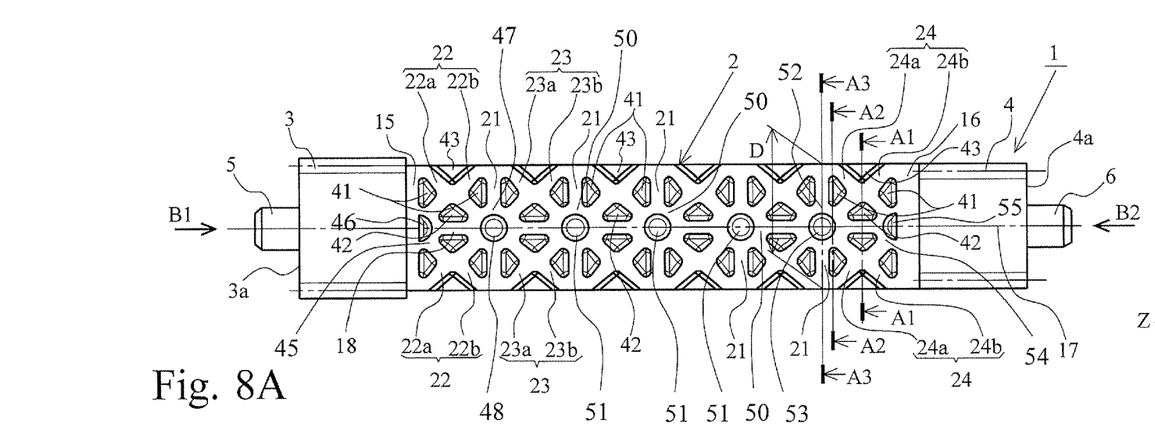
FIG. 8 is a diagram illustrating an injection molded shaft according to a fourth modification of the first embodiment of the invention and the diagram corresponds to FIG. 2.
Figures 8B, 8C:
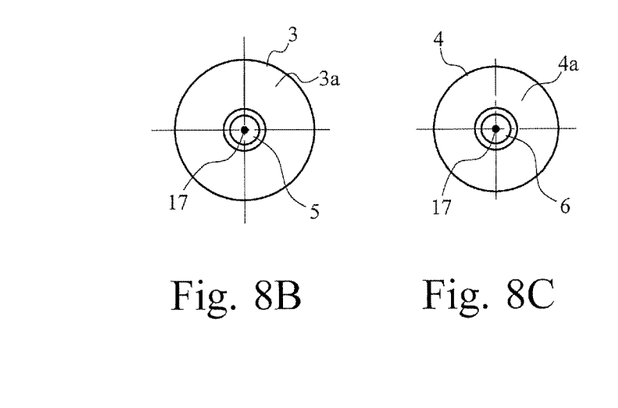
Figure 8D:
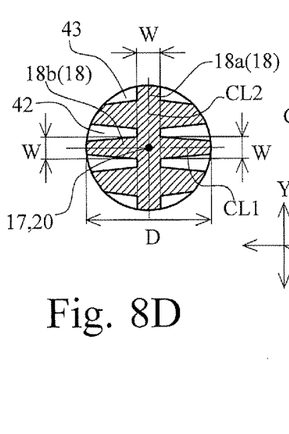
Figures 8E, 8F:
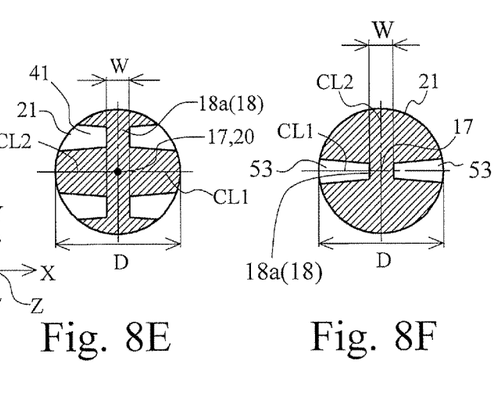

The above hollowed concave parts 46, 48, 51, 53, and 55 are line-symmetric with respect to the center line CL2 along the Y-axis (see FIGS. 8A and 8F). In addition, each of the hollowed concave parts 46, 48, 51, 53, and 55 has a disconnection gradient for facilitating separation from the injection molding die 7 and the wall thickness between these hollowed concave parts and the adjacent hollowed concave parts 41 and 42 is substantially the same as the wall thickness W of the connection portion between the first to fourth framework parts 21 to 24 and the first core portion 18a. In addition, the hollowed concave parts 46, 48, 51, 53, and 55 have a depth that reaches the first core portion 18a (see FIGS. 8A and 8F). The invention is not limited to the case in which the wall thickness between the hollowed concave parts 46, 48, 51, 53, and 55 and the adjacent hollowed concave parts 41 and 42 is substantially the same as the wall thickness W of the connection portion between the first to fourth framework parts 21 to 24 and the first core portion 18a and the wall thickness may be changed depending on the size of the shaft body 2, the magnitude of transfer torque, and the like. In addition, the depths of the hollowed concave parts 46, 48, 51, 53, and 55 are not limited to the depths that reach the first core portion 18a and the depths may be changed depending on the size of the shaft body 2, the magnitude of transfer torque, and the like.

In addition, the hollowed concave parts 46, 48, 51, 53, and 55 are formed orthogonally to the Y-Z coordinate plane and opened along the open direction of the injection molding die 7 (see FIG. 5).

In the injection molded shaft 1 according to the modification as described above, since the hollowed concave parts 46, 48, 51, 53, and 55 are formed, the number of portions having substantially the same wall thickness is larger than in the injection molded shaft 1 according to the first embodiment. Accordingly, the accuracy of the shape after injection molding is higher than in the injection molded shaft 1 according to the first embodiment.

Fifth Modification of First Embodiment

FIG. 9 is a front view of an injection molded shaft 1 according to the modification and the front view corresponds to FIG. 2A. As illustrated in FIG. 9, in the injection molded shaft 1 according to the modification, the shaft body 2 is shorter than the shaft body 2 of the injection molded shaft 1 according to the first embodiment. That is, in the modification, the shaft body 2 of the injection molded shaft 1 includes the discoid first connecting part 15 formed integrally with the first torque applied part 3, the discoid second connecting part 16 formed integrally with the second torque applied part 4, the core part 18, extending from the first connecting part 15 to the second connecting part 16 along the shaft core 17, that has a crisscross cross section orthogonal to the axial direction, and a diagonal-brace-shaped framework part 60, disposed in the portion partitioned by the first connecting part 15, the second connecting part 16, and the core part 18, that extends across the first connecting part 15, the second connecting part 16, and the core part 18 like a diagonal brace. The diagonal-brace-shaped framework part 60 includes the pair of diagonal brace members 22a and 22b intersecting like an X shape or the pair of diagonal brace members 24a and 24b intersecting like an X shape as described in detail in the first embodiment. In the injection molded shaft 1 illustrated in FIG. 9, the same structural portions as in the injection molded shaft 1 illustrated in FIG. 2A are given the same reference numerals and duplicate descriptions as in the first embodiment are omitted.

It can be considered that the shaft body 2 of the injection molded shaft 1 as described above is configured by one framework unit 61. That is, the framework unit 61 includes the core part 18, extending along the shaft core 17, that has a crisscross cross section orthogonal to the axial direction, a pair of discoid framework parts 62 and 62 (the first connecting part 15 and the second connecting part 16), disposed at one end and the other end along the shaft core 17 of the core part 18 so as to face each other, that have discoid cross sections orthogonal to the axial direction, the diagonal-brace-shaped framework parts 60 and 60, disposed in the portion partitioned by the pair of discoid framework parts 62 and 62 and the core part 18, that extend across the pair of discoid framework parts 62 and 62 and the core part 18 like a diagonal brace.

In the injection molded shaft 1 according to the modification as described above, even when sudden changes in torque are applied, the energy caused by sudden changes in torque can be absorbed by flexible twisting deformation of the shaft body 2 and the shock caused by sudden changes in torque can be reduced by twisting deformation of the shaft body 2.

When the injection molded shaft 1 according to the first embodiment is considered from the viewpoint of configuring the shaft body 2 using the framework unit 61 like the injection molded shaft 1 according to the modification, the shaft body 2 of the injection molded shaft 1 according to the first embodiment can be considered to have a plurality of (six) framework units 61. In the shaft body 2 of the injection molded shaft 1 according to the first embodiment, the first connecting part 15, the second connecting part 16, and the first framework part 21 are equivalent to the discoid framework parts 62. In addition, in the shaft body 2 of the injection molded shaft 1 according to the first embodiment, the pair of diagonal brace members 22a and 22b intersecting like an X shape, the pair of diagonal brace members 23a and 23b intersecting like an X shape, and the pair of diagonal brace members 24a and 24b are equivalent to the diagonal-brace-shaped framework part 60. In addition, in the injection molded shaft 1, the shaft body 2 may be configured by two or more pairs of framework units 61.

In addition, in the injection molded shaft 1 according to the modification, the diagonal-brace-shaped framework part 60 is configured by the pair of diagonal brace members 22a and 22b intersecting like an X shape or the pair of diagonal brace members 24a and 24b intersecting like an X shape. However, the invention is not limited to this modification and the diagonal-brace-shaped framework part 60 may be configured by one diagonal brace member 22a (24a) or one diagonal brace member 22b (24b).

Other Modifications

The injection molded shaft 1 according to the invention is not limited to the first embodiment described above and the first torque applied part may be a gear other than a helical gear, such as a spur gear or bevel gear and the second torque applied part may be a gear other than a worm, such as a spur gear or bevel gear. In addition, in the injection molded shaft 1 according to the invention, the first torque applied part and the second torque applied part only need to be portions to which a rotation torque is applied and may be, for example, a spline formation part, a key groove formation part, or the like for fixing a helical gear or the like.

REFERENCE SIGNS LIST

1: injection molded shaft
2: shaft body
3: helical gear (first torque applied part)
4: worm (second torque applied part)
15: first connecting part
16: second connecting part
17: shaft core (longitudinal center axis)
18: core part
21: first framework part
22: second framework part
23: third framework part
24: fourth framework part
33: first movable mold (shaft body formation portion)
60: diagonal-brace-shaped framework part
61: framework unit
62: discoid framework part

The invention claimed is:

1. An injection molded shaft comprising:
a first torque applied part formed at a first end in an axial direction;
a second torque applied part formed at a second end in the axial direction; and
a shaft body connecting the first torque applied part to the second torque applied part along a direction of a longitudinal center axis,
wherein the first torque applied part, the second torque applied part, and the shaft body are integrally formed of resin material to have a unitary one-piece construction,
wherein the shaft body includes:
a first connecting part formed integrally with the first torque applied part,
a second connecting part formed integrally with the second torque applied part,
a core part extending from the first connecting part to the second connecting part along the longitudinal center axis, the core part having a crisscross cross section orthogonal to the axial direction,
a plurality of first framework parts formed at regular intervals along the direction of the longitudinal center axis in the core part between the first connecting part and the second connecting part, each of the first framework parts having a discoid cross section orthogonal to the axial direction,
a second framework part disposed in a portion partitioned by the first connecting part, the first framework part adjacent to the first connecting part; and the core part, the second framework part being a diagonal brace extending across the first connecting part, the first framework part, and the core part,
a third framework part disposed in a portion partitioned by a pair of the first framework parts adjacent to each other and the core part, the third framework part being a diagonal brace extending across the pair of first framework parts and the core part, and
a fourth framework part disposed in a portion partitioned by the second connecting part, the first framework part adjacent to the second connecting part and the core part, the fourth framework part being a diagonal brace extending across the second connecting part, the first framework part, and the core part.

2. The injection molded shaft according to claim 1,
wherein, when the cross section orthogonal to the axial direction of the core part is an X-Y coordinate plane of a rectangular coordinate system, and a crisscross in the cross section orthogonal to the axial direction of the core part is aligned with an X-axis and a Y-axis, the shaft body is formed so as to be able to split a shaft body formation portion of an injection molding die into two in an X-axis direction or a Y-axis direction.

3. The injection molded shaft according to claim 2,
wherein the shaft body further includes:
a first intersecting portion between the second framework part and the core part,
a second intersecting portion between the first framework part, the second framework part, the third framework part, and the core part,
a third intersecting portion between the first framework part, the third framework part, and the core part,
a fourth intersecting portion between the first framework part, the third framework part, the fourth framework part, and the core part, and
a fifth intersecting portion between the fourth framework part and the core part, and
wherein each of the first intersecting portions to fifth intersecting portions has a hollowed concave part opened toward a die opening direction of the injection molding die.

4. The injection molded shaft according to claim 2,
wherein each of the second framework part, the third framework part, and the fourth framework part is configured by a pair of intersecting diagonal brace members having an X shape.

5. The injection molded shaft according to claim 2,
wherein each of the second framework part, the third framework part, and the fourth framework part is configured by one diagonal brace member.

6. The injection molded shaft according to claim 2,
wherein the core part and the first to fourth framework parts are formed so as to have the same wall thickness.

7. The injection molded shaft according to claim 2,
wherein a first one of the first torque applied part and the second torque applied part is a helical gear, and a second one of the first torque applied part and the second torque applied part is a worm.

8. The injection molded shaft according to claim 1,
wherein each of the second framework part, the third framework part, and the fourth framework part is configured by a pair of intersecting diagonal brace members having an X shape.

9. The injection molded shaft according to claim 1,
wherein each of the second framework part, the third framework part, and the fourth framework part is configured by one diagonal brace member.

10. The injection molded shaft according to claim 1,
wherein the core part and the first to fourth framework parts are formed so as to have the same wall thickness.

11. The injection molded shaft according to claim 1,
wherein a first one of the first torque applied part and the second torque applied part is a helical gear, and a second one of the first torque applied part and the second torque applied part is a worm.

\* \* \* \* \*